(12) United States Patent
Sai Krishna Murthy et al.

(10) Patent No.: US 12,361,098 B1
(45) Date of Patent: Jul. 15, 2025

(54) SERVER-BASED METHOD OF USING A TRAINED DEEP LEARNING MODEL AND GROUND TRUTH LABELS

(71) Applicant: Azira LLC, Pasadena, CA (US)

(72) Inventors: G Vamsi Sai Krishna Murthy, Bangalore (IN); Michelle Zhou, Pasadena, CA (US); Ravi Kaushik, Bangalore (IN); Bhavana Martha, Bangalore (IN); Shobhit Shukla, Bangalore (IN); Madhusudan Therani, San Jose, CA (US)

(73) Assignee: Azira LLC, Pasadena, CA (US)

( * ) Notice: Subject to any disclaimer, the term of this patent is extended or adjusted under 35 U.S.C. 154(b) by 0 days.

(21) Appl. No.: 18/581,056

(22) Filed: Feb. 19, 2024

Related U.S. Application Data

(63) Continuation of application No. 18/094,375, filed on Jan. 8, 2023, now abandoned.

(51) Int. Cl.
*G06F 16/00* (2019.01)
*G06F 18/2415* (2023.01)

(52) U.S. Cl.
CPC ................. *G06F 18/2415* (2023.01)

(58) Field of Classification Search
None
See application file for complete search history.

(56) References Cited

U.S. PATENT DOCUMENTS

| | | | |
|---|---|---|---|
| 6,072,461 A | 6/2000 | Haran | |
| 6,269,361 B1 | 7/2001 | Davis et al. | |
| 6,643,641 B1 | 11/2003 | Snyder | |
| 6,708,186 B1 | 3/2004 | Claborn et al. | |
| 7,092,569 B1 | 8/2006 | Kinjo | |
| 7,246,311 B2 | 7/2007 | Bargeron et al. | |
| 7,373,606 B2 | 5/2008 | Gorzela | |
| 7,379,591 B2 | 5/2008 | Kinjo | |
| 7,454,409 B2 | 11/2008 | Roy et al. | |
| 7,508,998 B2 | 3/2009 | Shiiyama | |
| 7,719,481 B2 | 5/2010 | Gormish | |
| 7,765,209 B1 | 7/2010 | Khesin et al. | |
| 7,921,187 B2 | 4/2011 | Lunati et al. | |
| 8,230,350 B2 | 7/2012 | Dodsworth | |
| 8,418,249 B1 * | 4/2013 | Nucci | G06F 21/552 709/225 |
| 8,438,184 B1 | 5/2013 | Wang et al. | |
| 8,713,193 B1 | 4/2014 | Breau et al. | |
| 9,622,036 B1 | 4/2017 | Jintaseranee et al. | |
| 10,057,651 B1 | 8/2018 | Singh et al. | |
| 10,120,765 B1 | 11/2018 | Whitmer | |
| 10,402,750 B2 * | 9/2019 | Weston | G06N 20/00 |

(Continued)

FOREIGN PATENT DOCUMENTS

| | | | | |
|---|---|---|---|---|
| EP | 3188086 A1 * | 7/2017 | ............ | G06N 3/045 |
| JP | 2002525765 | 8/2002 | | |

(Continued)

*Primary Examiner* — Jean M Corrielus
(74) *Attorney, Agent, or Firm* — Foley Hoag LLP; Erik A. Huestis; Joshua S. Matloff

(57) ABSTRACT

A server-implemented method for determining, at a server, using a deep learning model, a cluster of device identifiers associated with computing devices having characteristics that are related to a match set of computing devices based on locations data streams and ground truth labels.

17 Claims, 13 Drawing Sheets

(56) References Cited

U.S. PATENT DOCUMENTS

| | | | |
|---|---|---|---|
| 10,594,714 B2* | 3/2020 | Crabtree | H04L 63/20 |
| 10,623,426 B1* | 4/2020 | Yumer | H04L 63/1425 |
| 10,654,658 B2 | 5/2020 | Hamaguchi | |
| 10,839,315 B2* | 11/2020 | Bezzubtseva | G06N 20/00 |
| 2002/0035520 A1 | 3/2002 | Weiss | |
| 2002/0046102 A1 | 4/2002 | Dohring et al. | |
| 2002/0103781 A1 | 8/2002 | Mori et al. | |
| 2003/0048272 A1 | 3/2003 | Gormish | |
| 2003/0088623 A1 | 5/2003 | Kusuda | |
| 2003/0179780 A1 | 9/2003 | Walker et al. | |
| 2003/0200188 A1* | 10/2003 | Moghaddam | G06F 18/214 706/12 |
| 2004/0073520 A1 | 4/2004 | Eskandari | |
| 2004/0107159 A1 | 6/2004 | Heil | |
| 2006/0112039 A1* | 5/2006 | Wang | G06N 20/00 706/20 |
| 2006/0287989 A1 | 12/2006 | Glance | |
| 2007/0050251 A1 | 3/2007 | Jain et al. | |
| 2007/0050252 A1 | 3/2007 | Jain | |
| 2007/0050253 A1 | 3/2007 | Biggs et al. | |
| 2007/0174764 A1 | 7/2007 | Roseway et al. | |
| 2007/0300263 A1 | 12/2007 | Barton et al. | |
| 2008/0022229 A1 | 1/2008 | Bhumkar et al. | |
| 2008/0046316 A1 | 2/2008 | Shah et al. | |
| 2008/0086356 A1 | 4/2008 | Glassman et al. | |
| 2008/0113672 A1 | 5/2008 | Karr et al. | |
| 2008/0167941 A1 | 7/2008 | Kagarlis et al. | |
| 2008/0215546 A1 | 9/2008 | Baum et al. | |
| 2008/0255758 A1 | 10/2008 | Graham et al. | |
| 2009/0150203 A1 | 6/2009 | Baudisch et al. | |
| 2009/0177758 A1 | 7/2009 | Banger et al. | |
| 2009/0182589 A1 | 7/2009 | Kendall et al. | |
| 2009/0234711 A1 | 9/2009 | Ramer et al. | |
| 2009/0254456 A1 | 10/2009 | Sarbaev et al. | |
| 2009/0287837 A1 | 11/2009 | Felsher | |
| 2010/0023506 A1 | 1/2010 | Sahni et al. | |
| 2010/0057560 A1 | 3/2010 | Skudlark et al. | |
| 2010/0138291 A1 | 6/2010 | Silverman et al. | |
| 2010/0262479 A1 | 10/2010 | Sharp | |
| 2010/0325196 A1 | 12/2010 | Beckman et al. | |
| 2011/0013709 A1 | 1/2011 | Lu et al. | |
| 2011/0035284 A1 | 2/2011 | Moshfeghi | |
| 2011/0153433 A1 | 6/2011 | Rosenberger | |
| 2011/0178841 A1 | 7/2011 | Rane et al. | |
| 2011/0178995 A1 | 7/2011 | Suchter et al. | |
| 2011/0246457 A1 | 10/2011 | Dong et al. | |
| 2011/0320423 A1 | 12/2011 | Gemmell et al. | |
| 2012/0066312 A1 | 3/2012 | Kandekar et al. | |
| 2012/0184292 A1 | 7/2012 | Lin et al. | |
| 2012/0185458 A1 | 7/2012 | Liu et al. | |
| 2012/0190380 A1 | 7/2012 | Dupray et al. | |
| 2013/0031106 A1 | 1/2013 | Schechter et al. | |
| 2013/0054689 A1 | 2/2013 | Woldman et al. | |
| 2013/0124474 A1 | 5/2013 | Anderson | |
| 2013/0152160 A1 | 6/2013 | Smith et al. | |
| 2013/0246170 A1 | 9/2013 | Gross et al. | |
| 2013/0267255 A1 | 10/2013 | Liu et al. | |
| 2013/0298038 A1 | 11/2013 | Spivack et al. | |
| 2013/0347005 A1 | 12/2013 | Lam et al. | |
| 2014/0032326 A1* | 1/2014 | Li | G06Q 30/0266 705/14.58 |
| 2014/0040387 A1 | 2/2014 | Spivack et al. | |
| 2014/0129942 A1 | 5/2014 | Rathod | |
| 2014/0279757 A1 | 9/2014 | Shimanovsky et al. | |
| 2014/0304374 A1 | 10/2014 | McCue et al. | |
| 2015/0073893 A1 | 3/2015 | Brown | |
| 2015/0088665 A1 | 3/2015 | Karlsson | |
| 2015/0149297 A1 | 5/2015 | Mahadevan et al. | |
| 2015/0227851 A1 | 8/2015 | Kaisser | |
| 2015/0235258 A1 | 8/2015 | Shah et al. | |
| 2015/0271229 A1 | 9/2015 | Bullotta et al. | |
| 2015/0327007 A1 | 11/2015 | Li | |
| 2015/0345969 A1 | 12/2015 | McGavran et al. | |
| 2015/0379568 A1 | 12/2015 | Balasubramanian et al. | |
| 2016/0012240 A1 | 1/2016 | Smith et al. | |
| 2016/0036894 A1 | 2/2016 | Collins et al. | |
| 2016/0042407 A1 | 2/2016 | Els et al. | |
| 2016/0055244 A1 | 2/2016 | Wang | |
| 2016/0055693 A1 | 2/2016 | Somani et al. | |
| 2016/0086215 A1* | 3/2016 | Wang | G06Q 30/0275 705/14.45 |
| 2016/0105801 A1 | 4/2016 | Wittenberg et al. | |
| 2016/0117688 A1 | 4/2016 | Ghosh et al. | |
| 2016/0261621 A1 | 9/2016 | Srivastava et al. | |
| 2016/0350280 A1 | 12/2016 | Lavallee et al. | |
| 2016/0381110 A1 | 12/2016 | Barnett et al. | |
| 2016/0381155 A1 | 12/2016 | Pan et al. | |
| 2017/0148050 A1 | 5/2017 | Montero et al. | |
| 2017/0193390 A1* | 7/2017 | Weston | G06N 3/08 |
| 2017/0212894 A1 | 7/2017 | Feng et al. | |
| 2017/0264719 A1 | 9/2017 | Koramutla et al. | |
| 2017/0270122 A1* | 9/2017 | He | G06F 16/538 |
| 2017/0301043 A1 | 10/2017 | Soli | |
| 2017/0323230 A1 | 11/2017 | Bailey et al. | |
| 2017/0353477 A1 | 12/2017 | Faigon et al. | |
| 2018/0032938 A1 | 2/2018 | Scriffignano et al. | |
| 2018/0121827 A1* | 5/2018 | Green | G06N 20/10 |
| 2018/0165723 A1 | 6/2018 | Wright et al. | |
| 2018/0255084 A1* | 9/2018 | Kotinas | H04L 63/1425 |
| 2018/0310274 A1 | 10/2018 | Fan et al. | |
| 2019/0050874 A1 | 2/2019 | Matlick et al. | |
| 2019/0065908 A1* | 2/2019 | Lee | G06F 18/2155 |
| 2019/0102791 A1 | 4/2019 | Park et al. | |
| 2019/0196795 A1 | 6/2019 | Cavalier et al. | |
| 2019/0295408 A1 | 9/2019 | Wynter et al. | |
| 2019/0341153 A1 | 11/2019 | Ng et al. | |
| 2020/0065840 A1 | 2/2020 | Pinel et al. | |
| 2020/0077282 A1 | 3/2020 | Bhorkar et al. | |
| 2020/0107163 A1 | 4/2020 | Li et al. | |
| 2020/0110833 A1* | 4/2020 | Shivamoggi | G06Q 10/06313 |
| 2020/0112835 A1 | 4/2020 | Li et al. | |
| 2020/0141598 A1 | 5/2020 | Ahuja et al. | |
| 2020/0163044 A1 | 5/2020 | Bapat et al. | |
| 2020/0193315 A1* | 6/2020 | Sunkara | G06N 20/00 |
| 2020/0213865 A1 | 7/2020 | Lin et al. | |
| 2020/0272676 A1 | 8/2020 | Priness et al. | |
| 2020/0302224 A1* | 9/2020 | Jaganathan | G06F 18/217 |
| 2020/0302225 A1* | 9/2020 | Dutta | G06V 10/7715 |
| 2020/0336400 A1 | 10/2020 | Juen et al. | |
| 2020/0372006 A1 | 11/2020 | Boelderl-Ermel et al. | |
| 2021/0224258 A1 | 7/2021 | Faruquie et al. | |
| 2021/0224602 A1* | 7/2021 | Nori | G06F 18/2415 |
| 2021/0258400 A1* | 8/2021 | Therani | H04L 67/5682 |
| 2021/0258742 A1 | 8/2021 | Sakai et al. | |
| 2021/0313049 A1 | 10/2021 | Khan et al. | |
| 2022/0038423 A1* | 2/2022 | Levin | G06N 20/00 |
| 2022/0075897 A1* | 3/2022 | Epasto | G06F 21/6254 |
| 2022/0253725 A1* | 8/2022 | Feng | G06N 20/00 |
| 2023/0116735 A1* | 4/2023 | Nori | G06N 7/01 382/159 |
| 2023/0246935 A1* | 8/2023 | Tian | H04L 43/0876 709/224 |

FOREIGN PATENT DOCUMENTS

| | | |
|---|---|---|
| JP | 2003533757 | 11/2003 |
| JP | 2008539508 | 11/2008 |
| WO | 2000017824 | 3/2000 |
| WO | 200127847 | 4/2001 |
| WO | 2006115718 | 11/2006 |
| WO | 2009076555 | 6/2009 |
| WO | 2011116129 | 9/2011 |

\* cited by examiner

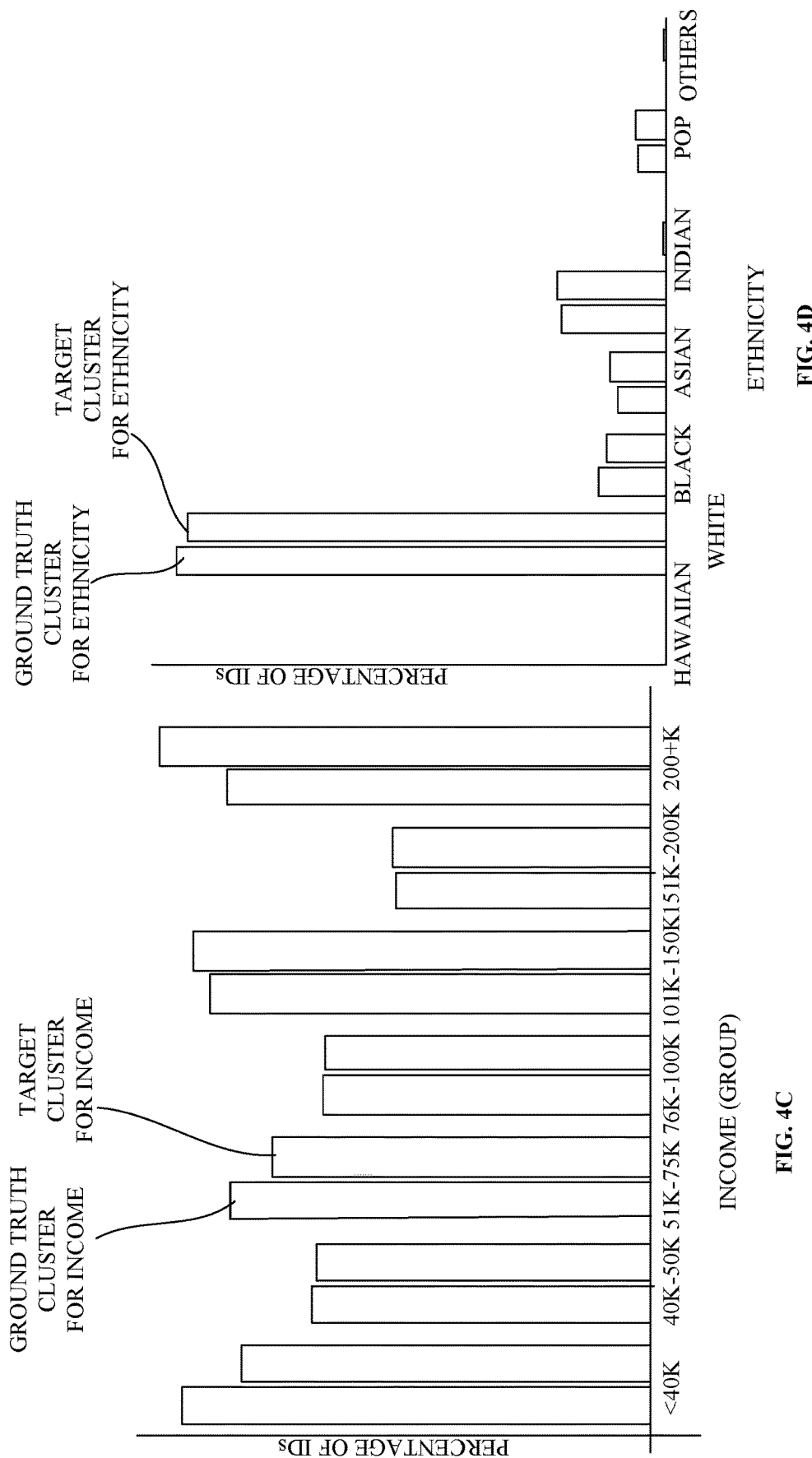

SERVER-BASED METHOD OF USING A TRAINED DEEP LEARNING MODEL AND GROUND TRUTH LABELS

CROSS-REFERENCE TO RELATED APPLICATIONS

This application is a continuation of U.S. application Ser. No. 18/094,375, filed Jan. 8, 2023 titled "METHOD FOR PERFORMING DEEP SIMILARITY MODELLING ON CLIENT DATA TO DERIVE BEHAVIORAL ATTRIBUTES AT AN ENTITY LEVEL," the entirety of which is incorporated by reference herein.

TECHNICAL FIELD

The embodiments herein relate to deep similarity modelling, and more specifically a method for performing deep similarity modelling on client data to derive behavioral attributes at an entity level.

DESCRIPTION OF THE RELATED ART

The COVID pandemic has significantly changed behavior of the consumers to a new normal and organizations have witnessed a major upheaval in determining the behavior patterns and journey of the users of the stores. In this regard, users' vicinity shopping and dwell time in engaging with the brand has drastically changed. Henceforth, predicting a retail potential for a given store is required to get a complete picture of both people and places in a given geography.

With ever increasing digitization and usage of smart mobile applications, users are generating a large amount of internet traffic data. The internet traffic data may be an indicator of location of the users at a given time frame. A variety of different events associated with the users are encoded in a number of data formats, recorded, and transmitted in a variety of data streams depending on the nature of the device. The smart mobile applications, when engaged with a user, generate an event that produces data streams with device identifiers that are an integral part of smartphone ecosystem and smart mobile applications economy.

Further, the data streams are from independently controlled sources. The independently controlled sources are sources of the data stream that control a variety of aspects such as the attributes which are collected, frequency and means of data being collected, format of data, format of populating the data stream and types of identifiers used.

Accordingly, there remains a need to address the aforementioned technical drawbacks in existing technologies to determine behavior of the consumers in an accurate manner.

SUMMARY

In view of the foregoing, an embodiment herein provides a method for performing a deep similarity modeling on client data to derive behavioral attributes at an entity level. The method includes (a) obtaining a first dataset of a first set of entities that are users associated with the client, the first dataset includes any of mobile entity identifiers, locations, or hashed email addresses of the users, (b) obtaining a second dataset of a second set of entities, the second dataset includes behavioral attributes of the second set of entities and any of mobile entity identifiers, locations, or hashed email addresses of the entities, (c) matching identifiers of the first dataset with the second dataset to obtain a matched set of entities, (d) generating ground truth labels for the matched set of entities, (e) determining a feature combination of at least one generic feature from the first dataset and at least one custom feature (specific to client) from the second dataset for the matched set of entities, (f) training a deep similarity model using ground truth labels and the feature combination as training data to obtain a trained deep similarity model, and (g) determining, using the trained deep similarity model and a classification method, similar entities from the second dataset.

In some embodiments, the method further includes (a) matching identifiers of the first dataset with the second dataset to obtain a matched set of entities, (b) generating ground truth labels for the matched set of entities, (c) determining the feature combination of the at least one generic feature from the first dataset and at least one custom feature from the second dataset for the matched set of entities, and (d) determining, using one-class classification method, similar entities from the second dataset, the similar entities are obtained when a plurality of behavioral attributes of the matched set of entities are similar to a plurality of behavioral attributes of the second set of entities while comparing each other.

In some embodiments, the method further includes (a) matching identifiers of the first dataset with the second dataset to obtain the matched set of entities, (b) determining the feature combination of the at least one generic feature from the first dataset and the at least one custom feature from the second dataset for the matched set of entities, (c) merging the feature combination with the generated ground truth labels for the matched set of entities, and (d) determining, using a binary-class classification method, contrary entities from the second dataset, the contrary entities comprise a first entity from the matched set of entities and a second entity from the second set of entities. The at least one behavioral attribute of the first entity is mutually exclusive from at least one behavioral attribute of the second entity.

In some embodiments, the method further includes (a) matching identifiers of the first dataset with the second dataset to obtain the matched set of entities, (b) generating, using classification method, ground truth labels for the matched set of entities (c) determining the feature combination of the at least one generic feature from the first dataset and the at least one custom feature from the second dataset for the matched set of entities, and (d) determining, using a multi-class classification method, entities with overlapping attributes of behavior from the second dataset, the entities with overlapping attributes of behavior are obtained when one or more behavioral attributes of the matched set of entities overlap in comparison with the plurality of behavioral attributes of the second set of entities.

In some embodiments, the method further includes merging a first behavioral attribute and a second behavioral attribute of the matched set of entities using the ground truth labels, the first behavioral attribute and the second behavioral attribute are associated with two mutually exclusive classes of behavior.

In some embodiments, the method further includes (a) obtaining weights of a plurality of behavioral attributes from the client, (b) configuring the trained deep similarity model based on the weights to obtain a re-configured model, and (c) generating a cluster for the matched set of entities using the re-configured model.

In some embodiments, the classification method depends on a level of similarity between behavioral attributes of the matched set of entities and behavioral attributes of the second set of entities.

In another aspect, there is provided a system for performing a deep similarity modeling on client data to derive behavioral attributes at an entity level. The system includes a processor and a memory that stores a set of instructions, which when executed by the processor, causes to perform: (a) obtaining a first dataset of a first set of entities that are users associated with the client, the first dataset includes any of mobile entity identifiers, locations, or hashed email addresses of the users, (b) obtaining a second dataset of a second set of entities, the second dataset includes behavioral attributes of the second set of entities and any of mobile entity identifiers, locations, or hashed email addresses of the entities, (c) matching identifiers of the first dataset with the second dataset to obtain a matched set of entities, (d) generating, using at least one classification method, ground truth labels for the matched set of entities, (e) determining a feature combination of at least one generic feature from the first dataset and at least one custom feature (specific to client) from the second dataset for the matched set of entities, (f) training a deep similarity model using ground truth labels and the feature combination as training data to obtain a trained deep similarity model, and (g) determining, using the trained deep similarity model and a classification method, similar entities from the second dataset.

In some embodiments, the processor is configured to further include (a) matching identifiers of the first dataset with the second dataset to obtain a matched set of entities, (b) generating, using classification method, ground truth labels for the matched set of entities, (c) determining the feature combination of the at least one generic feature from the first dataset and at least one custom feature from the second dataset for the matched set of entities, and (d) determining, using one-class classification method, similar entities from the second dataset, the similar entities are obtained when a plurality of behavioral attributes of the matched set of entities are similar to a plurality of behavioral attributes of the second set of entities while comparing each other.

In some embodiments, the processor is configured to further include (a) matching identifiers of the first dataset with the second dataset to obtain the matched set of entities, (b) determining the feature combination of the at least one generic feature from the first dataset and the at least one custom feature from the second dataset for the matched set of entities, (c) merging the feature combination with the generated ground truth labels for the matched set of entities, and (d) determining, using a binary-class classification method, a combination of the similar entities and contrary entities from the second dataset, the contrary entities comprise a first entity from the matched set of entities and a second entity from the second set of entities. The at least one behavioral attribute of the first entity is mutually exclusive from at least one behavioral attribute of the second entity.

In some embodiments, the processor is configured to further include (a) matching identifiers of the first dataset with the second dataset to obtain the matched set of entities, (b) generating ground truth labels for the matched set of entities (c) determining the feature combination of the at least one generic feature from the first dataset and the at least one custom feature from the second dataset for the matched set of entities, and (d) determining, using a multi-class classification method, the similar entities of multiple overlapping attributes of behavior from the second dataset, the similar entities of multiple overlapping attributes of behavior are obtained when one or more behavioral attributes of the matched set of entities overlap in comparison with the one or more behavioral attributes of the second set of entities.

In some embodiments, the processor is configured to further include merging a first behavioral attribute and a second behavioral attribute of the matched set of entities using the ground truth labels, the first behavioral attribute, and the second behavioral attribute are associated with two mutually exclusive classes of behavior.

In some embodiments, the processor is configured to further include (a) obtaining weights of one or more behavioral attributes from the client, (b) configuring the trained deep similarity model based on the weights to obtain a re-configured model, and (c) generating a cluster for the matched set of entities using the re-configured model.

In some embodiments, the classification method depends on a level of similarity between behavioral attributes of the matched set of entities and behavioral attributes of the second set of entities.

In another aspect, there is provided one or more non-transitory computer-readable storage mediums storing the one or more sequences of instructions, which when executed by the one or more processors, causes performing a deep similarity modeling on client data to derive behavioral attributes at an entity level by (a) obtaining a first dataset of a first set of entities that are users associated with the client, the first dataset includes any of mobile entity identifiers, locations, or hashed email addresses of the users, (b) obtaining a second dataset of a second set of entities, the second dataset includes behavioral attributes of the second set of entities and any of mobile entity identifiers, locations, or hashed email addresses of the entities, (c) matching identifiers of the first dataset with the second dataset to obtain a matched set of entities, (d) generating ground truth labels for the matched set of entities, (e) determining a feature combination of at least one generic feature from the first dataset and at least one custom feature (specific to client) from the second dataset for the matched set of entities, (f) training a deep similarity model using ground truth labels and the feature combination as training data to obtain a trained deep similarity model, and (g) determining, using the trained deep similarity model and a classification method, similar entities from the second dataset.

In some embodiments, the sequence of instructions further includes (a) matching identifiers of the first dataset with the second dataset to obtain a matched set of entities, (b) generating ground truth labels for the matched set of entities, (c) determining the feature combination of the at least one generic feature from the first dataset and at least one custom feature from the second dataset for the matched set of entities, and (d) determining, using one-class classification method, similar entities from the second dataset, the similar entities are obtained when a plurality of behavioral attributes of the matched set of entities are similar to one or more behavioral attributes of the second set of entities while comparing each other.

In some embodiments, the sequence of instructions further includes (a) matching identifiers of the first dataset with the second dataset to obtain the matched set of entities, (b) determining the feature combination of the at least one generic feature from the first dataset, and the at least one custom feature from the second dataset for the matched set of entities, (c) merging the feature combination with the generated ground truth labels for the matched set of entities, and (d) determining, using a binary-class classification method, a combination of the similar entities and contrary entities from the second dataset, the contrary entities comprise a first entity from the matched set of entities and a second entity from the second set of entities. The at least one behavioral attribute of the first entity is mutually exclusive from at least one behavioral attribute of the second entity.

In some embodiments, the sequence of instructions further includes merging a first behavioral attribute and a second behavioral attribute of the matched set of entities using the ground truth labels, the first behavioral attribute, and the second behavioral attribute are associated with two mutually exclusive classes of behavior.

In some embodiments, the sequence of instructions further includes (a) obtaining weights of a plurality of behavioral attributes from the client, (b) configuring the trained deep similarity model based on the weights to obtain a re-configured model, and (c) generating a cluster for the matched set of entities using the re-configured model.

In some embodiments, the classification method depends on a level of similarity between behavioral attributes of the matched set of entities and behavioral attributes of the second set of entities.

A system and method for performing a deep similarity modeling on client data to derive behavioral attributes at an entity level are provided. The system provides a scalable model at user ID level scoring. Thereby, behavioral attributes of entities are achieved. Hence, user clusters with a high confidence level are achieved with sample ingestion. The system enables visibility of any product's brand.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4C is a graphical representation of user clusters based on income that illustrates ground-truth clusters vs target clusters of one or more entities, according to some embodiments herein;

FIG. 4D is a graphical representation of user clusters based on ethnicity that illustrates ground-truth clusters vs target clusters of one or more entities, according to some embodiments herein;

DETAILED DESCRIPTION OF PREFERRED EMBODIMENTS

Figure 1:
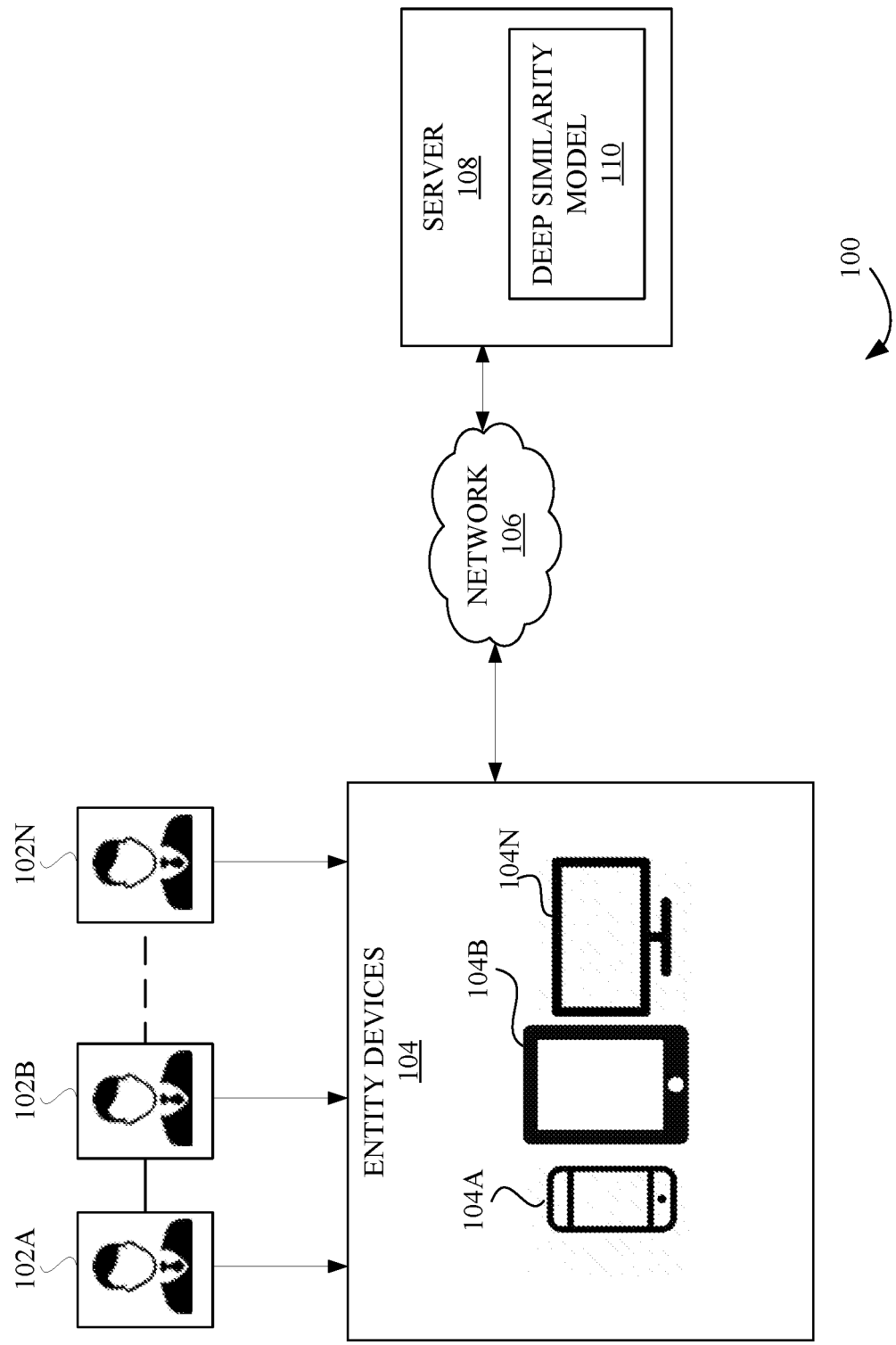
FIG. 1 is a schematic illustration of a system for performing a deep similarity modeling on client data to derive behavioral attributes at an entity level according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method for performing a deep similarity modeling, and more specifically, for an automatic system and method for performing a deep similarity modeling on client data to derive behavioral attributes at an entity level. Referring now to the drawings, and more particularly to FIGS. 1 to 7, where similar reference characters denote corresponding features consistently throughout the figures, there are shown preferred embodiments.

The term "independently controlled data sources" refers to any source that may control or standardize different aspects of data streams. The different aspects include, but are not limited to, (1) a type of data that needs to be collected, (2) a time and location of the data that needs to be collected, (3) a data collection method, (4) modification of collected data, (5) a portion of data to be revealed to the public, (6) a portion of the data to be protected, (7) a portion of data that can be permitted by a consumer or a user of an application or the device, and (8) a portion of data to be completely private. The terms "consumer" and "user" may be used interchangeably and refer to an entity associated with a network device or an entity device.

A single real-world event may be tracked by different independently controlled data sources. Alternatively, data from the different independently controlled data sources may be interleaved to understand an event or a sequence of events. For example, consider the consumer using multiple applications on his smartphone, as he or she interacts with each application, multiple independent data streams of the sequence of events may be produced. Each application may become an independent data source. Events and users may have different identifiers across different applications depending on how the application is implemented. Additionally, if one were to monitor a network, each application-level event may generate additional lower-level network events.

In an exemplary embodiment, various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one digital signal or analog signal for performing various functions as described herein.

FIG. 1 is a schematic illustration of a system 100 for performing a deep similarity modeling on client data to derive behavioral attributes at an entity level according to some embodiments herein. The system 100 includes one or more entity devices 104A-N associated with one or more entities 102A-N, and a server 108. The one or more entity devices 104A-N include one or more smart mobile applications. The one or more entity devices 104A-N are communicatively connected to the server 108 through a network 106. In some embodiments, the network 106 is at least one of a wired network, a wireless network, a combination of the wired network and the wireless network or the Internet.

In some embodiments, the one or more entity devices 104A-N include, but are not limited to, a mobile device, a smartphone, a smartwatch, a notebook, a Global Positioning System (GPS) device, a tablet, a desktop computer, a laptop or any network-enabled device that generates the location data streams.

The server 108 obtains the first dataset of the first set of entities. The first set of entities are entities that are associated with the client. The first dataset includes any mobile entity identifiers, locations, cookies, or hashed email addresses of the users. The server 108 obtains the second dataset of the second set of entities. The second dataset includes behavioral attributes of the second set of entities and any mobile entity identifiers, locations, or hashed email addresses of the entities.

The second set of entities may be user attributes, financial data, offline behavior, online behavior, social media, etc. The user attributes may include but are not limited to, demographics like gender, age group, income, ethnicity, profiles like parents, professionals, shoppers, travelers, affluents, health conscious, foodies, home location or proximity from home to store, dwell time at a store, brand affinity. The financial data may include, but is not limited to, point of sale like transaction date, long visits to a POI online/offline, size of a wallet, and share of wallet. The offline behavior may include, but is not limited to, location using probabilistic ping to POI assignment algorithm. The online behavior may include, but is not limited to, browsing habits like websites, articles, and products. Social media may include, but is not limited to, likability/dislike for some products, and purchase intent.

The server 108 may be configured to obtain the first dataset and the second dataset by location mapping of the one or more entities 102A-N. The server 108 may be configured to generate, using one or more location data streams that are associated with the one or more entities 102A-N, a location mapping of the one or more entities 102A-N with a geographical area. The location mapping may provide an ambient population of the geographical area of the one or more entities 102A-N. The one or more location data streams may be obtained from independently controlled data sources. The location data streams may include a real-time event with additional information including device attributes, connection attributes, and user agent strings. A connection attribute is a connection-indicative signal that may be generated at the one or more entity devices 104A-N. The connection attribute may be indicative of a presence or a characteristic of a connection between the one or more entity devices 104A-N and at least one other entity device of the one or more entity devices 104A-N or a server. The one or more connection attributes may include, but not be limited to, a connection type, an internet protocol address, and a carrier. For example, the one or more connection attributes may be "Cell4g,203.218.177.24,454-00". The user agent strings contain a number of tokens that refer to various aspects of a request from the one or more entity devices 104A-N to the server 108, including a browser name and a browser version, a rendering engine, the model number attribute of the one or more entity devices 104A-N, the operating system. For example, the user agent strings may be (a) "Mozilla/5.0 (Linux; Android 6.0; S9_N Build/MRA58K; wv)", (b) "AppleWebKit/537.36 (KHTML, like Gecko) Version/4.0", (c) "Chrome/84.0.4147.125" and (d) "Mobile Safari/537.36". Engagement of the one or more entity devices 104A-N with wi-fi hotspots may be tracked using location data streams that may be obtained from the different independently controlled data sources which may include telecom operators or smart mobile application data aggregators. The location data stream is the event or the sequence of events associated with time and location (longitude and latitude) and may also include additional payload information. The event or the sequence of events may be tracked by the different independently controlled data sources. For example, consider an entity 102A or a user using one or more smart mobile applications on an android phone associated with the entity 102A. As he or she interacts with each application, multiple independent streams of events may be produced and each application becomes an independent data source. Events and the one or more entity devices 104A-N may have different identifiers across different applications depending on how the smart mobile application is implemented. Additionally, if the network 106 were to be monitored, each smart mobile application-level event may generate additional lower-level network events.

The term "location" refers to a geographic location that includes a latitude-longitude pair and/or an altitude. The location may include a locality, a sub locality, an establishment, a geocode or an address. The location may be any geographic location on land or sea.

In some embodiments, the one or more entity devices 104A-N may run the one or more smart mobile applications that are responsible to generate location data streams.

In some embodiments, the independently controlled data sources may include (a) real-time bidding data that is an incoming data source that may be used for targeting an entity, (b) software development kit data that provides increased control, accuracy, and trust in the location data streams, and (c) third-party data sources that include app graph and professional data that may be used to enrich and build device signatures, or a list of normalized device models.

The server 108 may be configured to match identifiers of the first dataset with the second dataset to obtain a matched set of entities. The server 108 may be configured to generate ground truth labels for the matched set of entities using high confident entities. The ground truth labels for the matched set of entities may be also known as profiles. For example, the following tables (table 1, table 2, table 3) provide different profiles of entities.

The server 108 may be configured to determine similar entities from the second dataset using the trained deep similarity model and a classification method.

In some embodiments, the method further includes merging a first behavioral attribute and a second behavioral attribute of the matched set of entities using the ground truth labels, the first behavioral attribute and the second behavioral attribute are associated with two mutually exclusive classes of behavior.

In some embodiments, the method further includes (a) obtaining weights of one or more behavioral attributes from the client, (b) configuring the trained deep similarity model based on the weights to obtain a re-configured model, and (c) generating a cluster for the matched set of entities using the re-configured model. The following table 4 depicts an exemplary generation of a cluster for the matched set of entities, for example, fitness enthusiasts, based on the weights of one or more behavioral attributes against the entities, for example, low or medium.

TABLE 4

| Encrypted Device ID | fitness enthusiast |
| --- | --- |
| 7afc56283a18723a6ab43aa540267c31 | low |
| 188728d90e709816663d60db1bae62b9 | medium |

TABLE 1

| Name | Online client | Offline client | Digitally active client | Home location closer to store | Experimental mindset | Intent towards competitor | Student | Age | Score |
| --- | --- | --- | --- | --- | --- | --- | --- | --- | --- |
| John | Yes | No | Yes | Yes | High | Low | Yes | 18-24 | High Value |

TABLE 2

| Name | Online client | Offline client | Digitally active client | Home location closer to store | Experimental mindset | Intent towards competitor | Student | Age | Score |
| --- | --- | --- | --- | --- | --- | --- | --- | --- | --- |
| Mary | No | Yes | No | No (Far off) | High | Low | Yes | 45+ | Low Value |

TABLE 3

| Name | Online client | Offline client | Digitally active client | Home location closer to store | Experimental mindset | Intent towards competitor | Student | Age | Score |
| --- | --- | --- | --- | --- | --- | --- | --- | --- | --- |
| Kate | Yes | Yes | Yes | Yes | High | High | Yes | 18-24 | High Value |

The server 108 may be configured to determine a feature combination of at least one generic feature from the first dataset and at least one custom feature (specific to client) from the second dataset for the matched set of entities. The server 108 may be configured to train a deep similarity model 110 using ground truth labels and the feature combination as training data to obtain a trained deep similarity model.

TABLE 4-continued

| Encrypted Device ID | fitness enthusiast |
| --- | --- |
| 3022c2dfbdb856f6f01f7af107070396 | medium |
| 620f5317d7f7469f13d0e50976b3efc4 | medium |
| 3f0243688c0cea34df60a791369586a7 | medium |
| 44a385723b0e0fd2d2579e5c39c0c540 | medium |

In some embodiments, the classification method depends on a level of similarity between behavioral attributes of the matched set of entities and behavioral attributes of the second set of entities.

Figure 2:
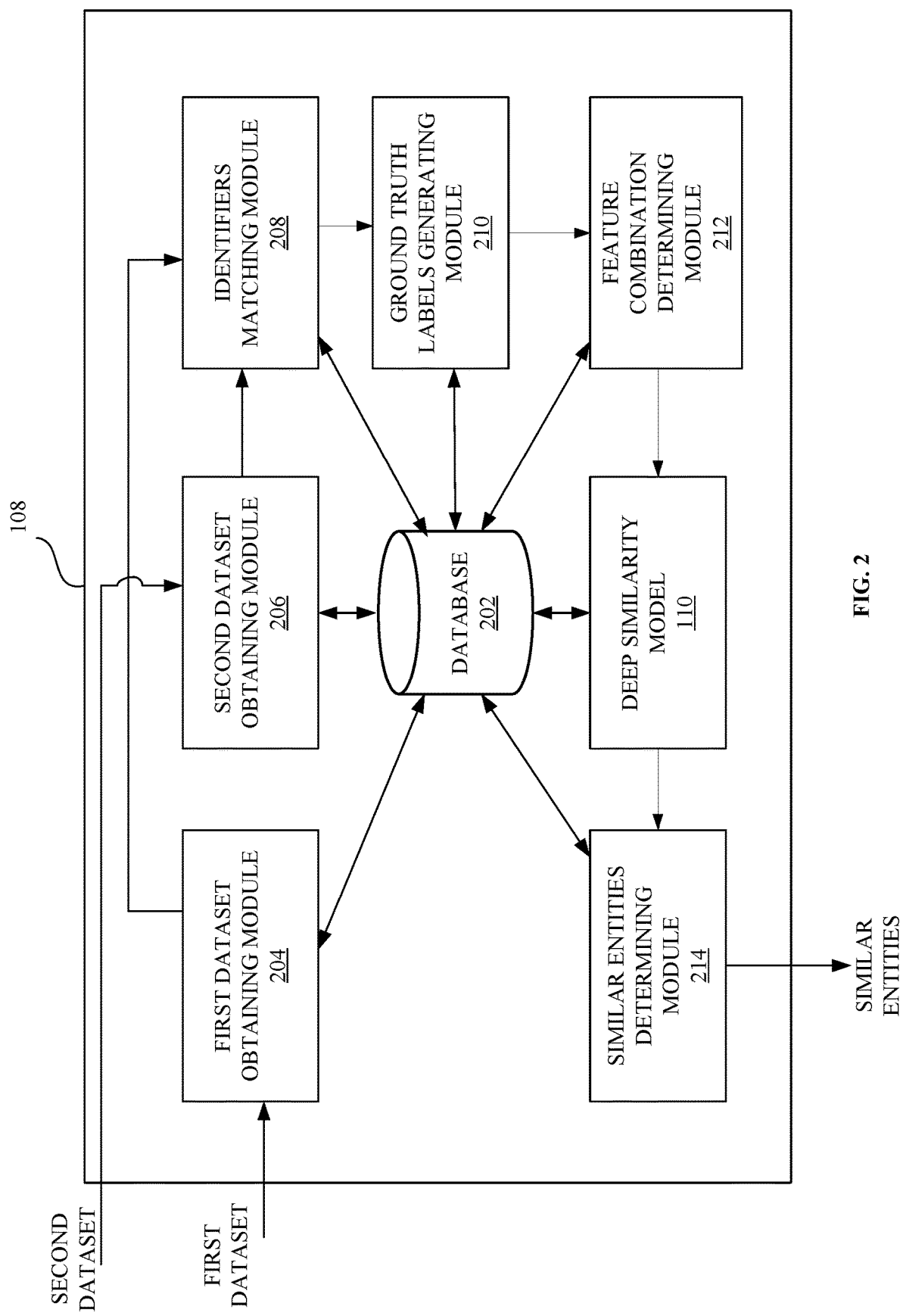
FIG. 2 is a block diagram of a server of FIG. 1 according to some embodiments herein.

FIG. 2 is a block diagram of the server 108 of FIG. 1 according to some embodiments herein. The server 108 includes a database 202, a first dataset obtaining module 204, a second dataset obtaining module 206, identifiers matching module 208, a ground truth labels generating module 210, a feature combination determining module 212, the deep similarity model 110 and similar entities determining module 214. The database 202 stores the first dataset, and the second dataset. The first dataset and the second dataset include the one or more location data streams that are obtained from independently controlled data sources where the location data streams include a real-time event with additional information including device attributes, connection attributes, user agent strings, behavioral attributes, mobile entity identifiers, locations, or hashed email addresses of the entities.

The first dataset obtaining module 204 is configured to obtain the first dataset of the first set of entities that are users associated with the client. The first dataset includes any of the mobile entity identifiers, locations, or hashed email addresses of the users.

The second dataset obtaining module 206 is configured to obtain the second dataset of the second set of entities. The second dataset includes behavioral attributes of the second set of entities and any mobile entity identifiers, locations, or hashed email addresses of the entities.

The identifiers matching module 208 is configured to match identifiers of the first dataset with the second dataset to obtain a matched set of entities. The ground truth labels generating module 210 is configured to generate ground truth labels for the matched set of entities using high confident entities.

The feature combination determining module 212 is configured to determine a feature combination of at least one generic feature from the first dataset and at least one custom feature (specific to the client) from the second dataset for the matched set of entities. The deep similarity model 110 is trained using ground truth labels and the feature combination as training data to obtain a trained deep similarity model.

The similar entities determining module 214 is configured to determine similar entities from the second dataset using the trained deep similarity model and a classification method.

Figure 3A:
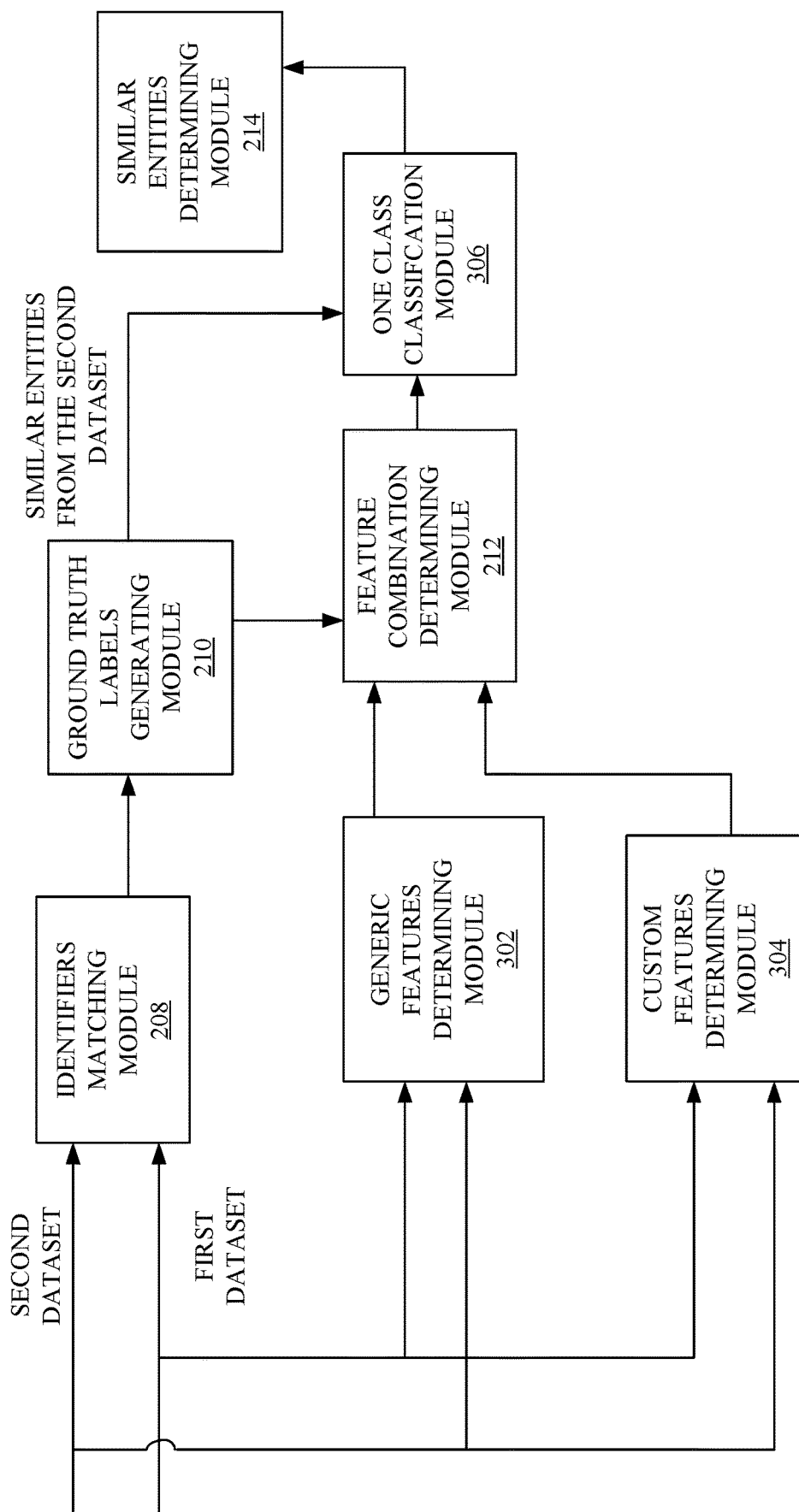
FIG. 3A is an exemplary flow diagram of performing a deep similarity modeling on client data to derive behavioral attributes using a one-class classification method, according to some embodiments herein.

FIG. 3A is an exemplary flow diagram of performing a deep similarity modeling on client data to derive behavioral attributes using a one-class classification method, according to some embodiments herein. The exemplary flow diagram includes matching, using the identifiers matching module 208, identifiers of the first dataset with the second dataset to obtain the matched set of entities. The exemplary flow diagram includes determining, using the feature combination determining module 212, the feature combination of the at least one generic feature from the first dataset and the at least one custom feature from the second dataset for the matched set of entities. The at least one generic feature from the first dataset is determined by generic features determining module 302. The at least one custom feature from the second dataset is determined by custom features determining module 304. The exemplary flow diagram includes merging the feature combination with the generated ground truth labels for the matched set of entities. The exemplary flow diagram includes determining, using the one-class classification module 306, similar entities from the second dataset, the similar entities are obtained when one or more behavioral attributes of the matched set of entities are similar to one or more behavioral attributes of the second set of entities while comparing each other.

Figure 3B:
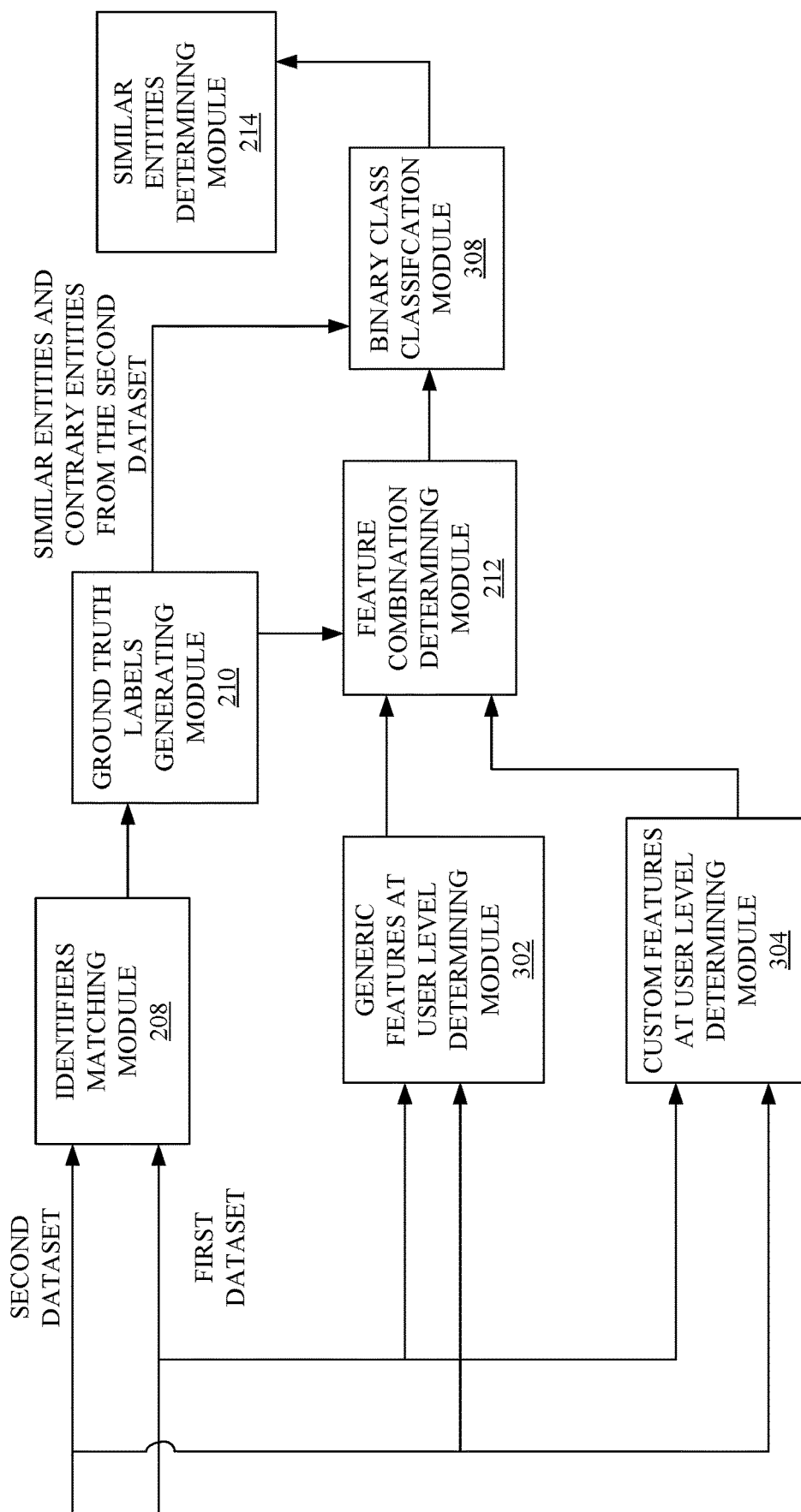
FIG. 3B is an exemplary flow diagram of performing a deep similarity modeling on client data to derive behavioral attributes using a binary classification method, according to some embodiments herein.

FIG. 3B is an exemplary flow diagram of performing a deep similarity modeling on client data to derive behavioral attributes using a binary classification method, according to some embodiments herein. The exemplary flow diagram includes matching, using the identifiers matching module 208, identifiers of the first dataset with the second dataset to obtain the matched set of entities. The exemplary flow diagram includes determining, using the feature combination determining module 212, the feature combination of the at least one generic feature from the first dataset and the at least one custom feature from the second dataset for the matched set of entities. The at least one generic feature from the first dataset is determined by generic features determining module 302. The at least one custom feature from the second dataset is determined by custom features determining module 304. The exemplary flow diagram includes merging the feature combination with the generated ground truth labels for the matched set of entities. The exemplary flow diagram includes determining, using the binary class classification module 308, a combination of the similar entities and contrary entities from the second dataset, the contrary entities comprise the first entity from the matched set of entities and the second entity from the second set of entities. The at least one behavioral attribute of the first entity is mutually exclusive from at least one behavioral attribute of the second entity.

Figure 3C:
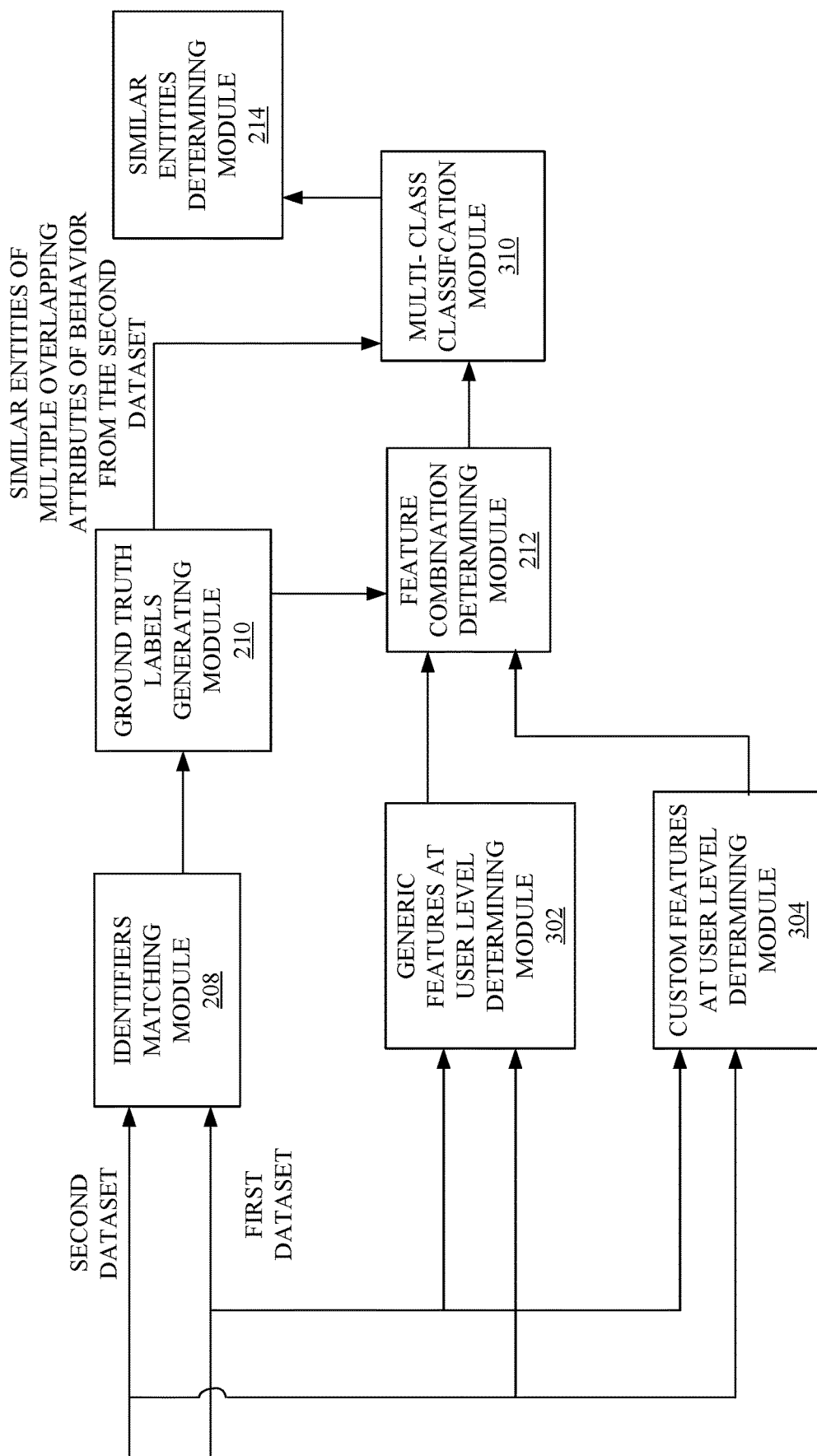
FIG. 3C is an exemplary flow diagram of performing a deep similarity modeling on client data to derive behavioral attributes using a multi-class classification method, according to some embodiments herein.

FIG. 3C is an exemplary flow diagram of performing a deep similarity modeling on client data to derive behavioral attributes using a multi-class classification method, according to some embodiments herein. The exemplary flow diagram includes matching, using the identifiers matching module 208, identifiers of the first dataset with the second dataset to obtain the matched set of entities. The exemplary flow diagram includes determining, using the feature combination determining module 212, the feature combination of the at least one generic feature from the first dataset and the at least one custom feature from the second dataset for the matched set of entities. The at least one generic feature from the first dataset is determined by generic features determining module 302. The at least one custom feature from the second dataset is determined by custom features determining module 304. The exemplary flow diagram includes determining, using the multi-class classification module 310, the similar entities of multiple overlapping attributes of behavior from the second dataset, the similar entities of multiple overlapping attributes of behavior are obtained when one or more behavioral attributes of the matched set of entities overlap in comparison with the plurality of behavioral attributes of the second set of entities.

Figures 4A, 4B:
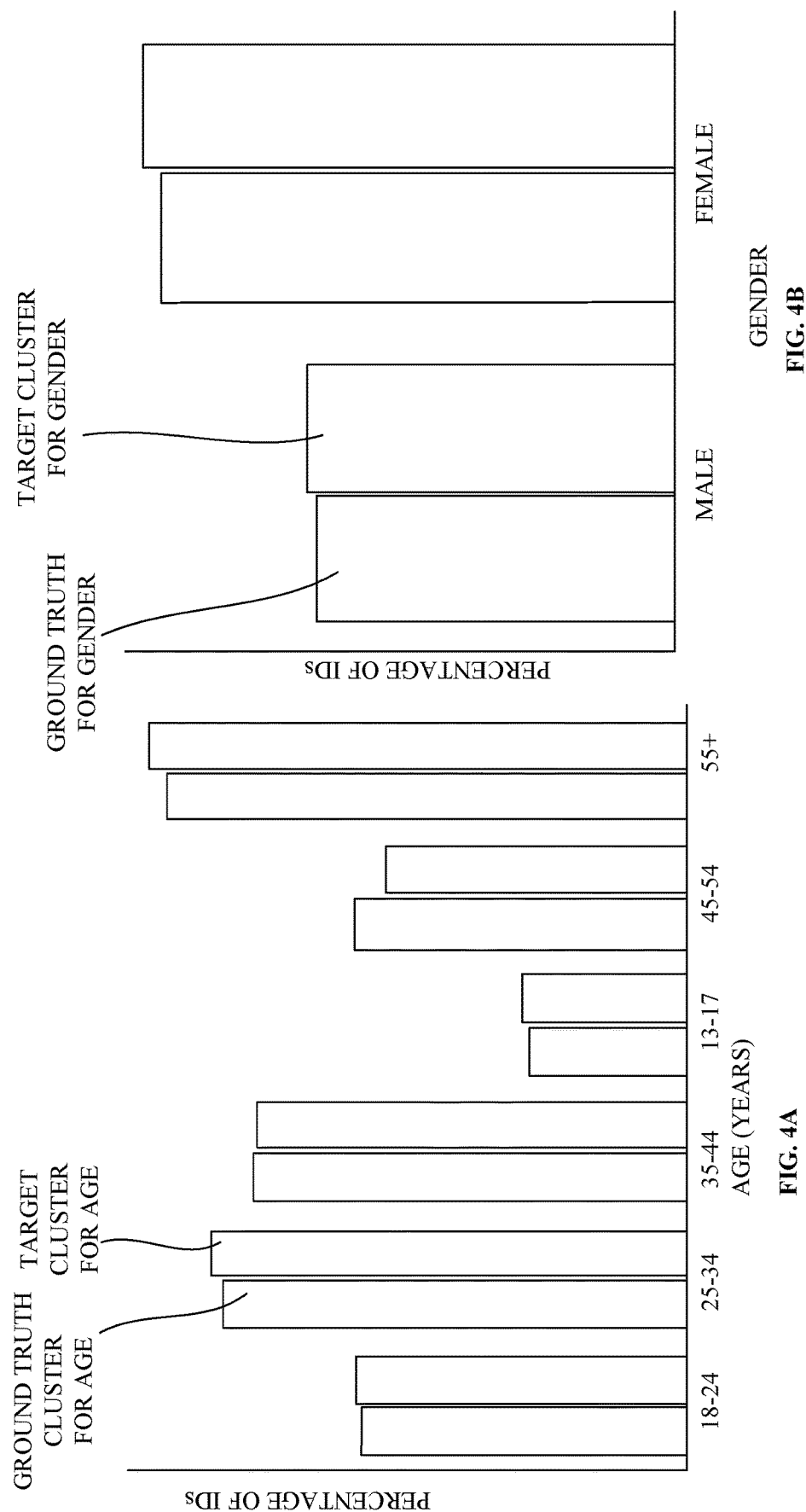
FIG. 4A is a graphical representation of user clusters based on an age group that illustrates ground-truth clusters vs target clusters of one or more entities, according to some embodiments herein.
FIG. 4B is a graphical representation of user clusters based on gender that illustrates ground-truth clusters vs target clusters of one or more entities, according to some embodiments herein.

FIG. 4A is a graphical representation of user clusters based on an age group that illustrates ground-truth clusters vs target clusters of one or more entities 102A-N, according to some embodiments herein. The graphical representation depicts the percentage of user IDs on the Y axis and the age group in years on the X axis. The graphical representation depicts ground-truth clusters vs target clusters of the one or more entities 102A-N based on age groups.

FIG. 4B is a graphical representation of user clusters based on gender that illustrates ground-truth clusters vs target clusters of one or more entities 102A-N, according to some embodiments herein. The graphical representation depicts the percentage of user IDs on the Y axis and gender on the X axis. The graphical representation depicts ground-truth clusters vs target clusters of one or more entities 102A-N based on gender.

FIG. 4C is a graphical representation of user clusters based on income that illustrates ground-truth clusters vs target clusters of one or more entities 102A-N, according to some embodiments herein. The graphical representation depicts the percentage of user IDs on the Y axis and the income group on the X axis. The graphical representation depicts ground-truth clusters vs target clusters of one or more entities 102A-N based on income group.

FIG. 4D is a graphical representation of user clusters based on ethnicity that illustrates ground-truth clusters vs target clusters of one or more entities 102A-N, according to some embodiments herein. The graphical representation depicts the percentage of user IDs on the Y axis and ethnicity on the X axis. The graphical representation depicts ground-truth clusters vs target clusters of one or more entities 102A-N based on ethnicity.

Figures 4E, 4F:
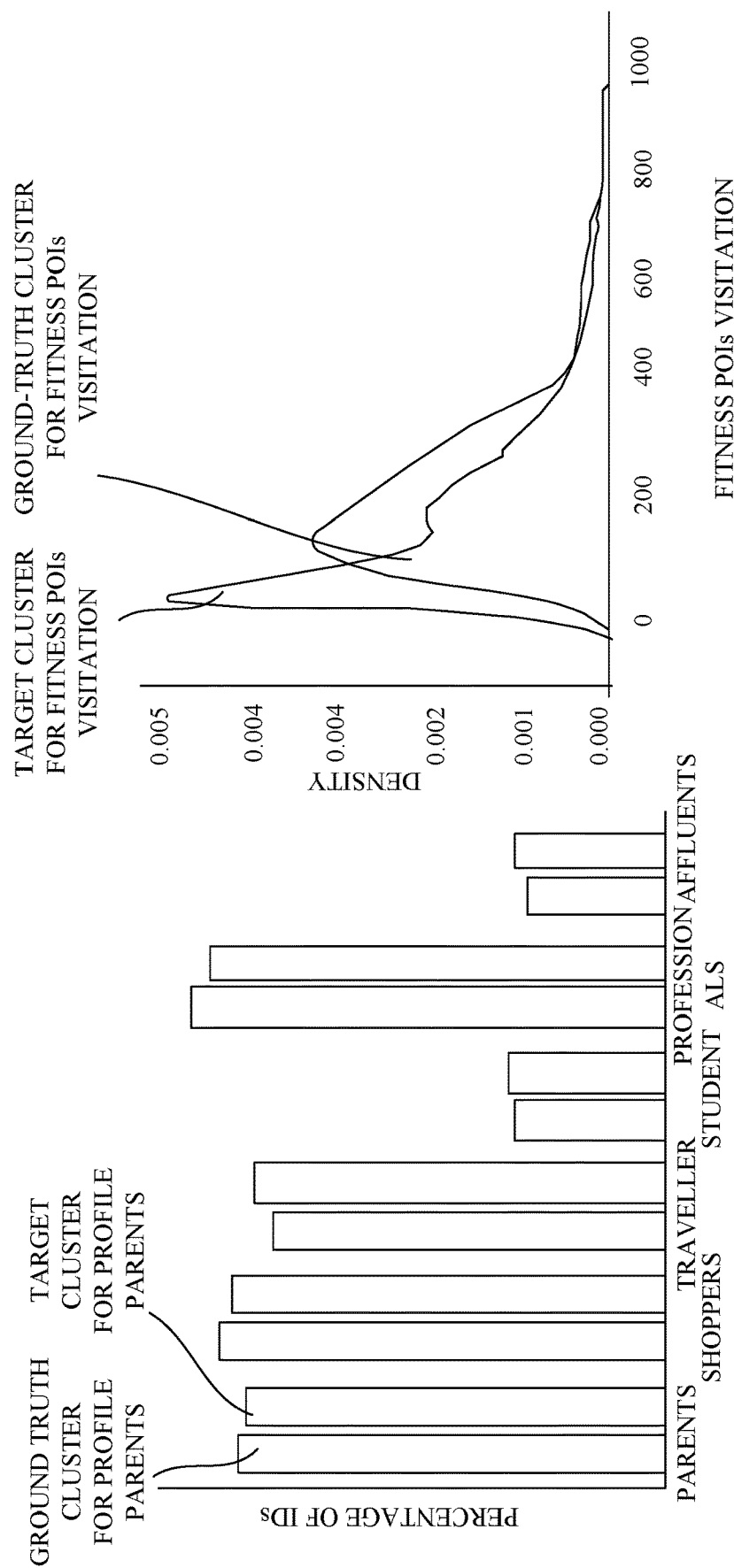
FIG. 4E is a graphical representation of user clusters based on profiles that illustrate ground-truth clusters vs target clusters of one or more entities, according to some embodiments herein.
FIG. 4F is a graphical representation of user clusters based on fitness visitations that illustrate ground-truth clusters vs target clusters of one or more entities, according to some embodiments herein.

FIG. 4E is a graphical representation of user clusters based on profiles that illustrate ground-truth clusters vs target clusters of one or more entities 102A-N, according to some embodiments herein. The graphical representation depicts the percentage of user IDs on the Y axis and profiles on the X axis. The graphical representation depicts ground-truth clusters vs target clusters of one or more entities 102A-N based on profiles.

FIG. 4F is a graphical representation of user clusters based on fitness visitations that illustrate ground-truth clusters vs target clusters of one or more entities 102A-N, according to some embodiments herein. The graphical representation depicts the percentage of density on the Y axis and fitness visitations on the X axis. The graphical representation depicts ground-truth clusters vs target clusters of one or more entities 102A-N based on fitness visitations.

Figures 4G, 4H:
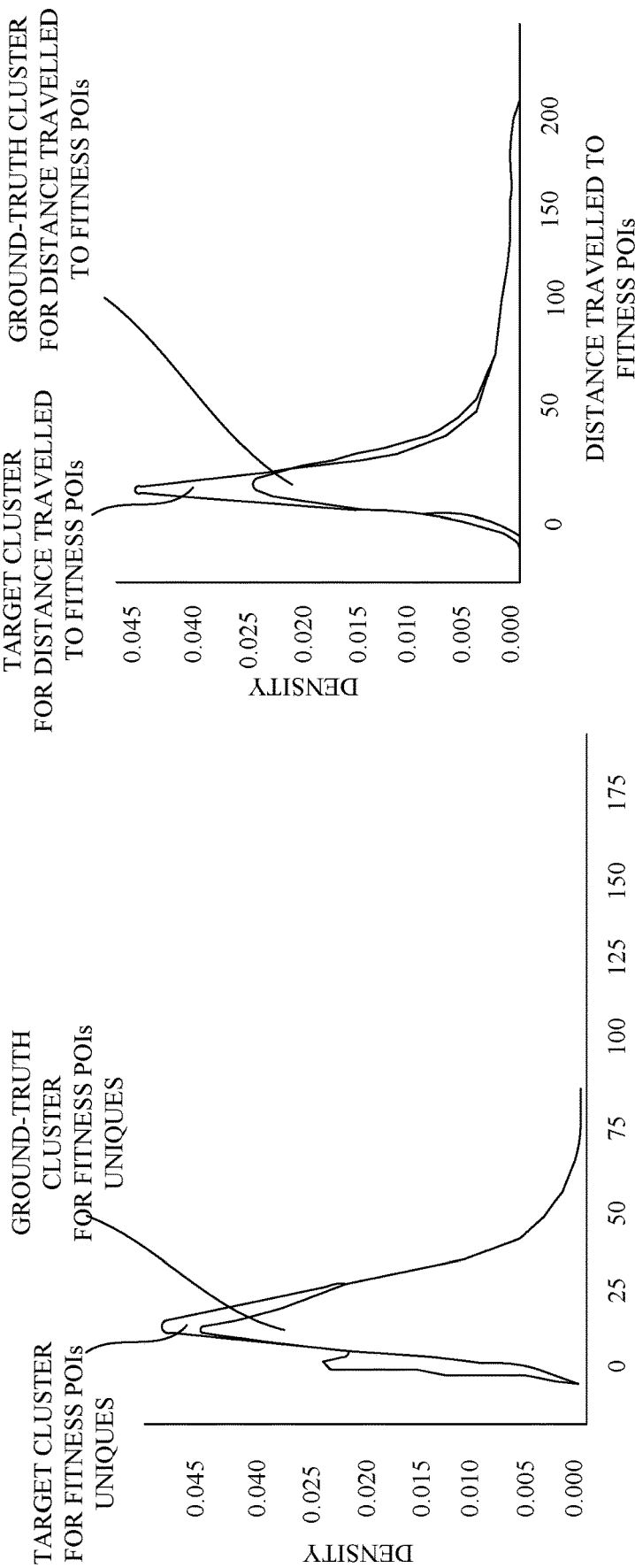
FIG. 4G is a graphical representation of user clusters based on fitness uniques that illustrate ground-truth clusters vs target clusters of one or more entities, according to some embodiments herein.
FIG. 4H is a graphical representation of user clusters based on distance travelled to fitness centers that illustrates ground-truth clusters vs target clusters of one or more entities, according to some embodiments herein.

FIG. 4G is a graphical representation of user clusters based on fitness uniques that illustrates ground-truth clusters vs target clusters of one or more entities 102A-N, according to some embodiments herein. The graphical representation depicts the percentage of density on the Y axis and fitness uniques on the X axis. The graphical representation depicts ground-truth clusters vs target clusters of one or more entities 102A-N based on fitness uniques.

FIG. 4H is a graphical representation of user clusters based on distance travelled to fitness centers that illustrates ground-truth clusters vs target clusters of one or more entities 102A-N, according to some embodiments herein. The graphical representation depicts the percentage of density on the Y axis and the distance travelled to fitness centers on the X axis. The graphical representation depicts ground-truth clusters vs target clusters of one or more entities 102A-N based on the distance travelled to fitness centers.

Figure 5:
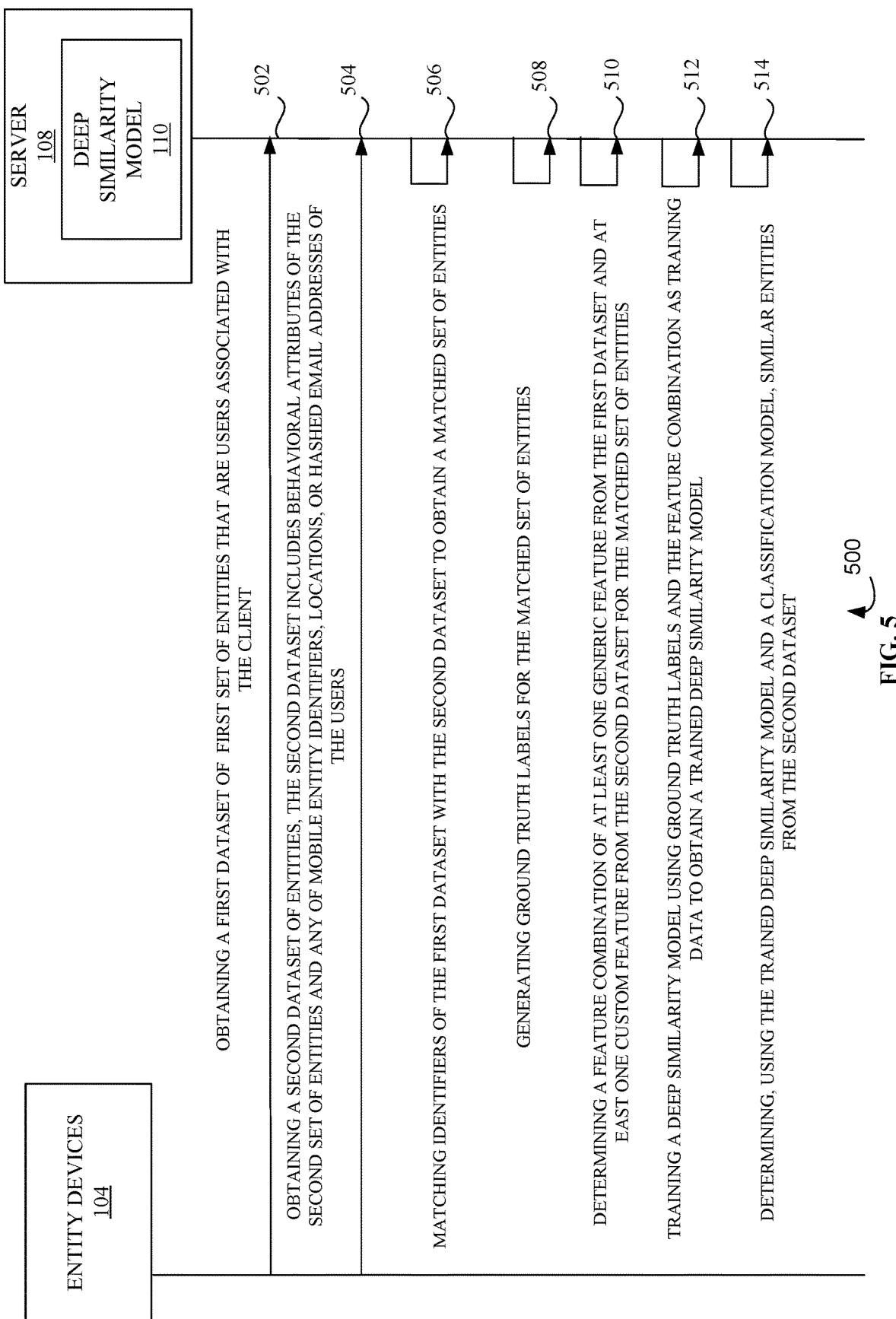
FIG. 5 illustrates an interaction diagram of a method for performing a deep similarity modeling on client data to derive behavioral attributes at an entity level according to some embodiments herein.

FIG. 5 illustrates an interaction diagram 500 of a method for performing a deep similarity modeling on client data to derive behavioral attributes at an entity level according to some embodiments herein. At step 502, a first dataset of a first set of entities that are users associated with the client are obtained. At step 504, a second dataset of a second set of entities are obtained. At step 506, identifiers of the first dataset are matched with the second dataset to obtain a matched set of entities. At step 508, ground truth labels for the matched set of entities are generated. The matched set of entities are generated using high confident entities. At step 510, a feature combination of at least one generic feature from the first dataset and at least one custom feature (specific to client) from the second dataset for the matched set of entities are determined. At step 512, a deep similarity model is trained using ground truth labels and the feature combination as training data to obtain a trained deep similarity model. At step 514, similar entities from the second dataset are determined using the trained deep similarity model and a classification method.

Figure 6A:
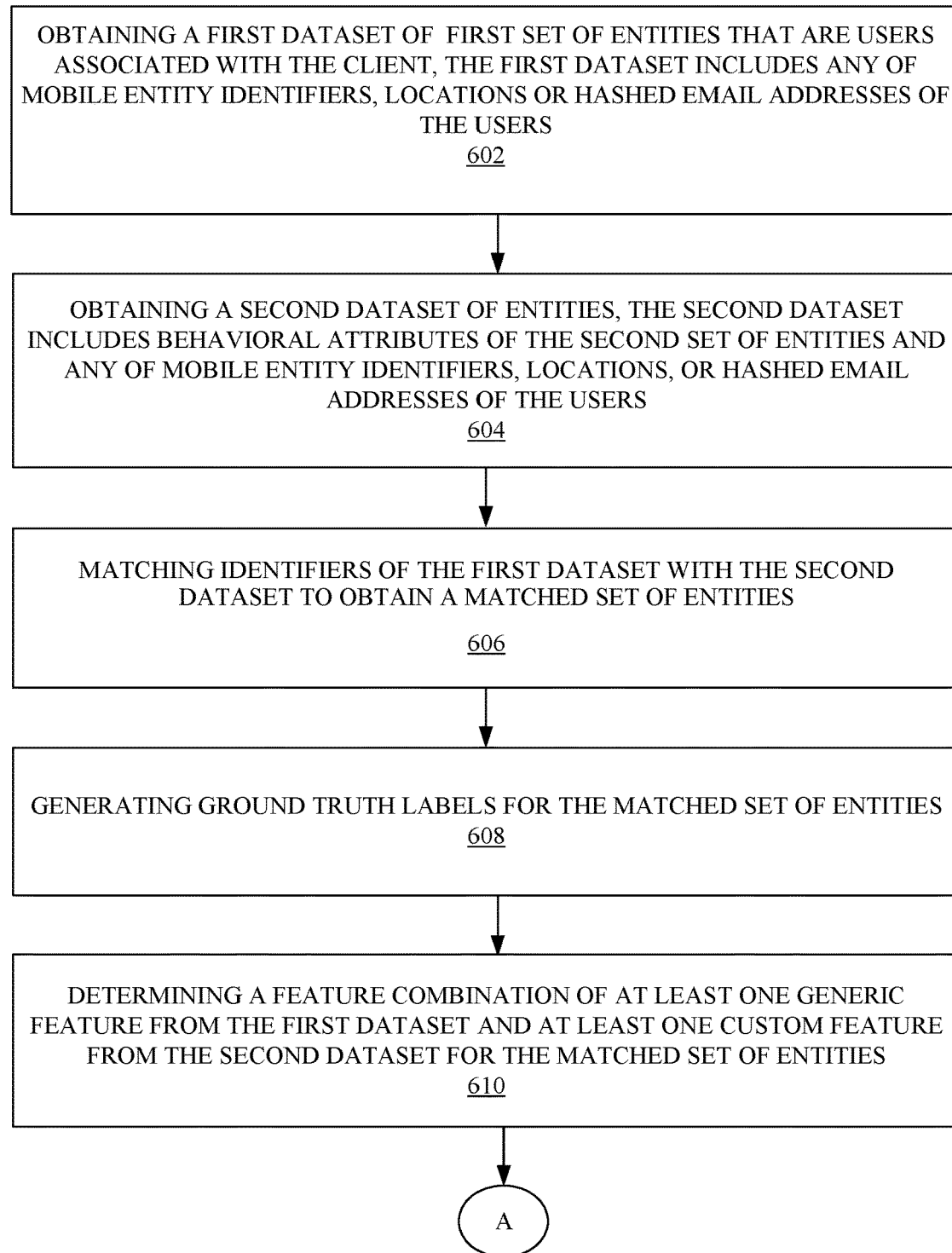
FIGS. 6A and 6B are flow diagrams of a method for performing a deep similarity modeling on client data to derive behavioral attributes at an entity level according to some embodiments herein.
Figure 6B:
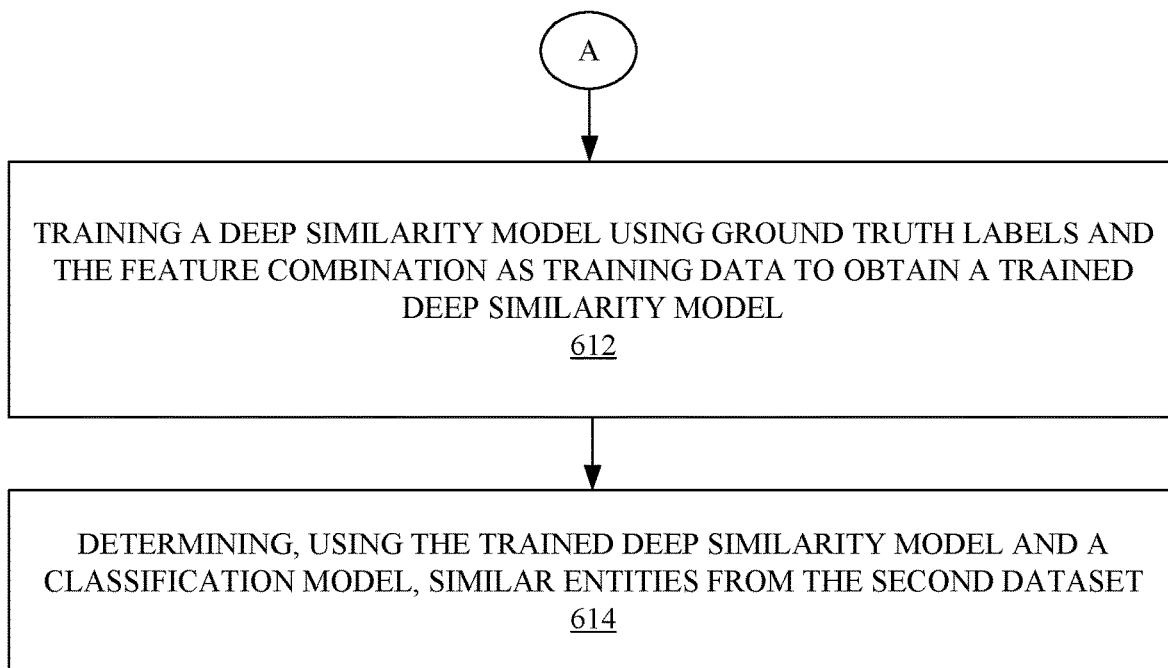

FIGS. 6A and 6B are flow diagrams of a method for performing a deep similarity modeling on client data to derive behavioral attributes at an entity level according to some embodiments herein. At step 602, the method includes obtaining a first dataset of a first set of entities that are users associated with the client. The first dataset includes any of mobile entity identifiers, locations, or hashed email addresses of the users. At step 604, the method includes obtaining a second dataset of a second set of entities. The second dataset includes behavioral attributes of the second set of entities and any of mobile entity identifiers, locations, or hashed email addresses of the entities. At step 606, the method includes matching identifiers of the first dataset with the second dataset to obtain a matched set of entities. At step 608, the method includes generating ground truth labels for the matched set of entities. The matched set of entities are generated using high confident entities. At step 610, the method includes determining a feature combination of at least one generic feature from the first dataset and at least one custom feature (specific to client) from the second dataset for the matched set of entities. At step 612, the method includes training a deep similarity model using ground truth labels and the feature combination as training data to obtain a trained deep similarity model. At step 614, the method includes determining, using the trained deep similarity model and a classification method, similar entities from the second dataset.

In some embodiments, the processor is configured to further include (a) matching identifiers of the first dataset with the second dataset to obtain a matched set of entities, (b) generating ground truth labels for the matched set of entities, (c) determining the feature combination of the at least one generic feature from the first dataset and at least one custom feature from the second dataset for the matched set of entities, and (d) determining, using one-class classification method, similar entities from the second dataset, the similar entities are obtained when a plurality of behavioral attributes of the matched set of entities are similar to a plurality of behavioral attributes of the second set of entities while comparing each other.

In some embodiments, the processor is configured to further include (a) matching identifiers of the first dataset with the second dataset to obtain the matched set of entities, (b) determining the feature combination of the at least one generic feature from the first dataset and the at least one custom feature from the second dataset for the matched set of entities, (c) merging the feature combination with the generated ground truth labels for the matched set of entities, and (d) determining, using a binary-class classification method, a combination of the similar entities and contrary entities from the second dataset, the contrary entities comprise a first entity from the matched set of entities and a second entity from the second set of entities. The at least one behavioral attribute of the first entity is mutually exclusive from at least one behavioral attribute of the second entity.

In some embodiments, the processor is configured to further include merging a first behavioral attribute and a second behavioral attribute of the matched set of entities using the ground truth labels, the first behavioral attribute, and the second behavioral attribute are associated with two mutually exclusive classes of behavior.

In some embodiments, the processor is configured to further include (a) obtaining weights of one or more behavioral attributes from the client, (b) configuring the trained deep similarity model based on the weights to obtain a re-configured model, and (c) generating a cluster for the matched set of entities using the re-configured model.

In some embodiments, the classification method depends on a level of similarity between behavioral attributes of the matched set of entities and behavioral attributes of the second set of entities.

Figure 7:
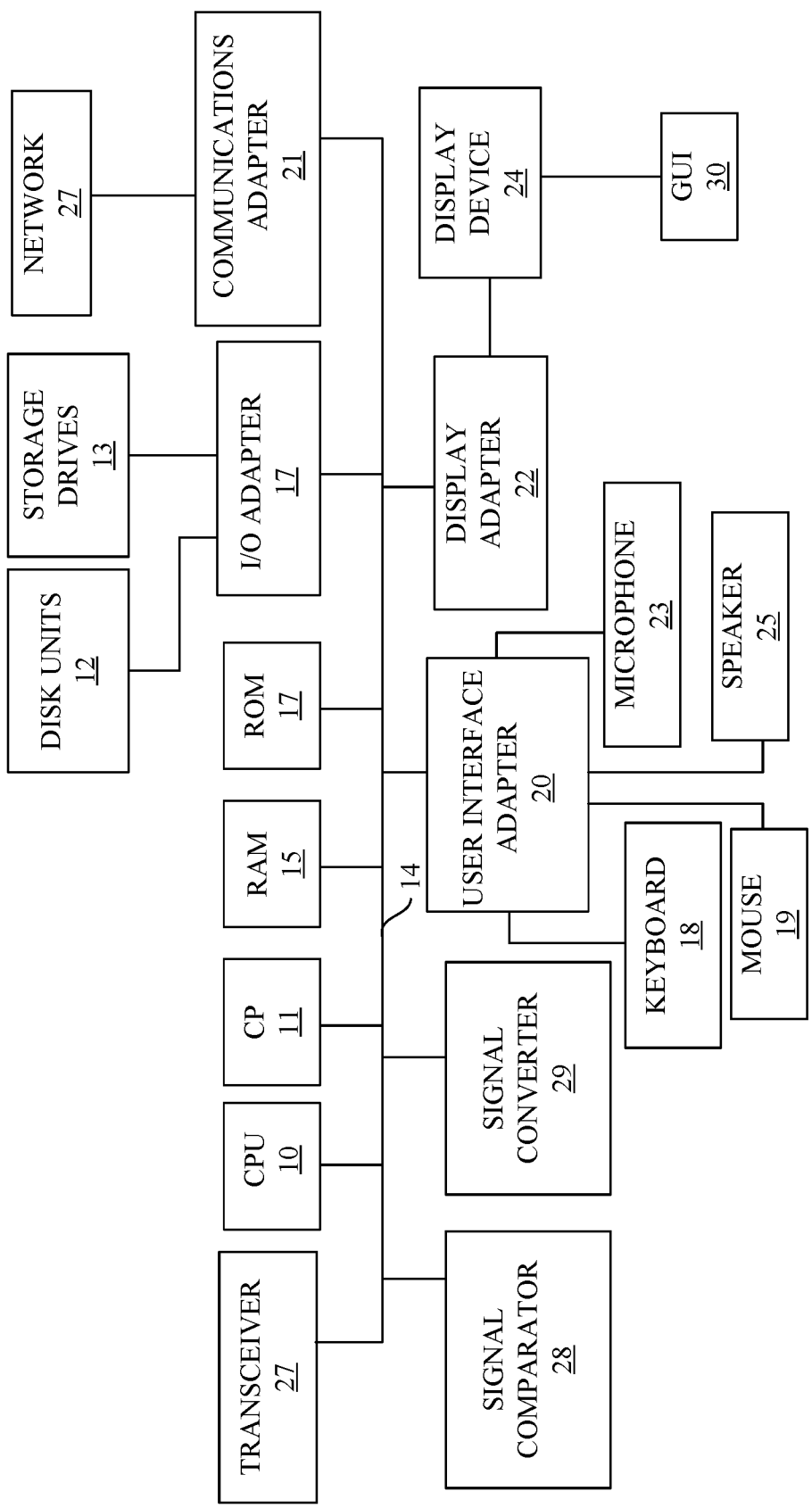
FIG. 7 is a schematic diagram of a computer architecture of the unique generated identifier server or one or more devices in accordance with embodiments herein.

A representative hardware environment for practicing the embodiments herein is depicted in FIG. 7, with reference to FIGS. 1 through 6A and 6B. This schematic drawing illustrates a hardware configuration of a server 108 or a computer system or a computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A server-implemented method for determining, at a server, using a trained deep learning model, a cluster of device identifiers associated with computing devices having truth labels based on locations data streams obtained from the computing devices, the method comprising:
    obtaining, at the server, a first dataset of a first set of entities, each entity of the first data set being a user associated with a client computing device, wherein the first dataset comprises entity identifiers, locations, cookies, and hashed email addresses of the entities;
    obtaining, at the server, a second dataset of a second set of entities, each entity associated with a client computing device in a geographical area, wherein the second dataset comprises behavioral attributes of the second set of computing devices, mobile entity identifiers, hashed email addresses of the entities, and the locations data streams, the locations data streams comprising characteristics, connection characteristics, and user agent strings, the user agent strings comprising a plurality of tokens comprising a request from the second set of computing devices;
    generating, at the server, a plurality of match sets of entities, each match set comprising a first client computing device associated with an entity of the first dataset and a second client computing device associated with an entity of the second dataset;
    determining, at the server, for each of the plurality of match sets, a ground truth label, each ground truth label determined using at least high confidence entities of the first dataset and the second dataset;
    providing, at the server, to the trained deep learning model, the ground truth labels;
    using the trained deep learning model to generate the cluster of device identifiers, the cluster of device identifiers generated based on a level of similarity between behavioral attributes of the match set and behavioral attributes of the second set of computing devices, each device identifier of the cluster being associated with one of the computing devices associated with the entities of the second dataset; and
    obtaining, at the server, from the trained deep learning model, the cluster, the cluster comprising a plurality of device identifiers and a behavioral attribute for each device identifier.

2. The server-implemented method of claim 1, wherein the trained deep learning model is trained using the ground truth labels and at least one custom feature specific to the client.

3. The server-implemented method of claim 1, further comprising: determining, using the trained deep learning model and a one-class classification method on the second dataset, the cluster of the device identifiers associated with the computing devices having the characteristics that are similar to the match set from the first dataset, from the second dataset.

4. The server-implemented method of claim 1, wherein at least one characteristic of the first computing device is mutually exclusive from at least one characteristic of the second computing device.

5. The server-implemented method of claim 4, further comprising: merging a first behavioral attribute and a second behavioral attribute of the matched set using the ground truth labels, wherein the first behavioral attribute and the second behavioral attribute are associated with two mutually exclusive classes of behavior.

6. The server-implemented method of claim 1, further comprising: determining, using the trained deep learning model and a classification method, the cluster of the device identifiers having multiple overlapping characteristics of behavior to the confident computing devices from the first dataset, from the second dataset, wherein the device identifiers having the multiple overlapping characteristics of behavior are obtained when a plurality of first behavioral characteristics of the matched set overlap in comparison with a plurality of second behavioral characteristics of the second set.

7. The server-implemented method of claim 1, further comprising: scoring the matched set of computing devices against a behavioral attribute by: generating a user scoring model based on a function of the behavioral attributes of the matched set of computing entities; and assigning, using the user scoring model, a score for each of the matched set of computing entities against the behavioral attribute.

8. The server-implemented method of claim 1, further comprising: obtaining weights of a plurality of behavioral attributes from the client; configuring the trained deep learning model based on the weights to obtain a reconfigured deep learning model; and generating a cluster for a matched set of computing devices using the re-configured deep learning model.

9. The server-implemented method of claim 1, wherein the classification method depends on a level of learning between behavioral attributes of the matched set and behavioral attributes of the second set.

10. A system for determining, at a server, using a trained deep learning model, a cluster of device identifiers associated with computing devices having characteristics based on locations data streams obtained from the computing devices, the system comprising:
a processor; and
a memory that stores a set of instructions, which when executed by the processor, causes it to perform:
obtaining, at the server, a first dataset of a first set of computing entities, each entity of the first data set being a user associated with a client computing device, wherein the first dataset comprises entity identifiers, locations, cookies, and hashed email addresses of the entities;
obtaining, at the server, a second dataset of a second set of entities, each entity associated with a client computing device in a geographical area, wherein the second dataset comprises behavioral attributes of the second set of computing devices, mobile entity identifiers, hashed email addresses of the entities, and the locations data streams, the location data streams comprising characteristics, connection characteristics, and user agent strings, the user agent strings comprising a plurality of tokens comprising a request from the second set of computing devices;
generating, at the server, a plurality of match sets of entities, each match set comprising a first client computing device associated with an entity of the first dataset and a second client computing device associated with an entity of the second dataset;
determining, at the server, for each of the plurality of match sets, a ground truth label, each ground truth label determined using at least high confidence entities of the first dataset and the second dataset;
providing, at the server, to the trained deep learning model, the ground truth labels; using the trained deep learning model to generate the cluster of device identifiers, the cluster of device identifiers generated based on a level of similarity between behavioral attributes of the match set and behavioral attributes of the second set of computing devices, each device identifier of the cluster being associated with one of the computing devices associated with the entities of the second dataset; and
obtaining, at the server, from the trained deep learning model, the cluster, the cluster comprising a plurality of device identifiers and a behavioral attribute for each device identifier.

11. The system of claim 10, wherein the processor further performs determining, using the trained deep learning model and a one-class classification method on the second dataset, the cluster of the device identifiers associated with the computing devices of the computing devices having the characteristics that are similar to the confident computing devices from the first dataset, from the second dataset.

12. The system of claim 10, wherein at least one characteristic of the first computing device is mutually exclusive from at least one characteristic of the second computing device.

13. The system of claim 12, wherein the processor further performs merging a first behavioral attribute and a second behavioral attribute of the matched set using the ground truth labels, wherein the first behavioral attribute and the second behavioral attribute are associated with two mutually exclusive classes of behavior.

14. The system of claim 10, wherein the processor further performs determining, using the trained deep learning model and a classification method, the cluster of the device identifiers having multiple overlapping characteristics of behavior to the confident computing devices from the first dataset, from the second dataset, wherein the device identifiers having the multiple overlapping characteristics of behavior are obtained when a plurality of first behavioral characteristics of the matched set overlap in comparison with a plurality of second behavioral characteristics of the second set.

15. The system of claim 10, wherein the processor further performs scoring a matched set of computing devices against a behavioral attribute by: generating a user scoring model based on a function of behavioral attributes of the matched set of computing devices; and assigning, using the user scoring model, a score for each of the matched set of computing devices against the behavioral attribute.

16. The system of claim 10, wherein the processor further performs: obtaining weights of a plurality of behavioral attributes from the client; configuring the trained deep learning model based on the weights to obtain a reconfigured deep learning model; and generating a cluster for a matched set of computing devices using the re-configured deep learning model.

17. The system of claim 10, wherein the classification method, the classification method dpending on a level of learning between behavioral attributes of a matched set of computing devices and behavioral attributes of the second set of computing devices.

* * * * *